US012631346B2

(12) United States Patent
Xiao et al.

(10) Patent No.: US 12,631,346 B2
(45) Date of Patent: May 19, 2026

(54) ELECTRIC BOILER DEVICE BASED ON UTILIZATION OF RESIDUAL ENERGY OF ELEVATOR, AND CONTROL METHOD

(71) Applicant: ZHEJIANG UNIVERSITY OF TECHNOLOGY, Zhejiang (CN)

(72) Inventors: Gang Xiao, Zhejiang (CN); Haoxin Zhang, Zhejiang (CN); Zhenbo Cheng, Zhejiang (CN); Xia Zhang, Zhejiang (CN); Yanfang Huang, Zhejiang (CN); Yuanming Zhang, Zhejiang (CN); Xuesong Xu, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 501 days.

(21) Appl. No.: 18/473,172

(22) Filed: Sep. 22, 2023

(65) Prior Publication Data

US 2024/0328636 A1      Oct. 3, 2024

(30) Foreign Application Priority Data

Apr. 3, 2023      (CN) .......................... 202310344662.X

(51) Int. Cl.
        *F24D 19/10*          (2006.01)
        *B66B 1/30*          (2006.01)
        (Continued)

(52) U.S. Cl.
        CPC .......... *F24D 19/1051* (2013.01); *B66B 1/302* (2013.01); *B66B 11/008* (2013.01);
        (Continued)

(58) Field of Classification Search
        CPC .. F24D 19/1051; F24D 3/082; F24D 17/0057; F24D 19/082; F24D 2200/08;
        (Continued)

(56) References Cited

FOREIGN PATENT DOCUMENTS

CN          101338956 B    *    7/2011
CN          207459742          6/2018
        (Continued)

OTHER PUBLICATIONS

JP_2007238228_A translation (Year: 2026).*
        (Continued)

*Primary Examiner* — Michael G Hoang
*Assistant Examiner* — Kurt J Wolford
(74) *Attorney, Agent, or Firm* — JCIPRNET

(57)                ABSTRACT

An electric boiler device based on utilization of residual energy of an elevator includes a heat storage module, an electric heating module and a control module. A heat storage water tank of the heat storage module is replenished with water from a tap water pipe network, and a preheating unit of the heat storage module converts the residual energy of the elevator into heat energy of the heat storage water tank by using an energy consumption resistor. The control module replenishes a heating water tank with water by delivering preheated water to the electric heating module according to a water level of the heating water tank, and controls a heating unit of the electric heat module to heat the heating water tank according to a user-set temperature, and heated hot water is provided through a user water supply pipe network.

9 Claims, 7 Drawing Sheets

(51) Int. Cl.

| | |
|---|---|
| *B66B 11/00* | (2006.01) |
| *F24D 3/08* | (2006.01) |
| *F24D 17/00* | (2022.01) |
| *F24D 19/08* | (2006.01) |
| *F24H 1/20* | (2022.01) |
| *F24H 9/20* | (2022.01) |
| *F24H 15/156* | (2022.01) |
| *F24H 15/223* | (2022.01) |
| *F24H 15/248* | (2022.01) |
| *F24H 15/335* | (2022.01) |
| *F24H 15/37* | (2022.01) |
| *H02P 3/14* | (2006.01) |
| *H02P 3/24* | (2006.01) |
| *H02P 27/06* | (2006.01) |

(52) U.S. Cl.
CPC ......... *F24D 3/082* (2013.01); *F24D 17/0057* (2013.01); *F24D 19/082* (2013.01); *F24H 1/202* (2013.01); *F24H 9/2021* (2013.01); *F24H 15/156* (2022.01); *F24H 15/223* (2022.01); *F24H 15/248* (2022.01); *F24H 15/335* (2022.01); *F24H 15/37* (2022.01); *H02P 3/14* (2013.01); *H02P 3/24* (2013.01); *H02P 27/06* (2013.01); *F24D 2200/08* (2013.01); *F24D 2200/29* (2013.01); *F24D 2200/32* (2013.01); *Y02B 50/00* (2013.01)

(58) Field of Classification Search
CPC . F24D 2200/29; F24D 2200/32; B66B 1/302; B66B 11/008; F24H 1/202; F24H 9/2021; F24H 15/156; F24H 15/223; F24H 15/248; F24H 15/335; F24H 15/37; H02P 3/14; H02P 3/24; H02P 27/06; Y02B 50/00

See application file for complete search history.

(56) References Cited

FOREIGN PATENT DOCUMENTS

| | | | | | |
|---|---|---|---|---|---|
| CN | 207573088 | | 7/2018 | | |
| CN | 207815742 | U * | 9/2018 | | |
| CN | 208817697 | U * | 5/2019 | | |
| CN | 110436283 | | 11/2019 | | |
| CN | 210297270 | | 4/2020 | | |
| CN | 111908309 | | 11/2020 | | |
| CN | 114940427 | | 8/2022 | | |
| CN | 114940427 | A * | 8/2022 | ............... | H02J 7/14 |
| CN | 217183015 | | 8/2022 | | |
| EP | 2397434 | A1 * | 12/2011 | ............ | B66B 1/302 |
| JP | 2007238228 | A * | 9/2007 | | |

OTHER PUBLICATIONS

CN-101338956-B translation (Year: 2026).*
CN-114940427-A translation (Year: 2026).*
CN-207815742-U translation (Year: 2026).*
CN-208817697-U translaton (Year: 2026).*
EP-2397434-A1 translation (Year: 2026).*

* cited by examiner

ELECTRIC BOILER DEVICE BASED ON UTILIZATION OF RESIDUAL ENERGY OF ELEVATOR, AND CONTROL METHOD

CROSS-REFERENCE TO RELATED APPLICATION

This application claims the priority benefit of China application serial no. 202310344662.X, filed on Apr. 3, 2023. The entirety of the above-mentioned patent application is hereby incorporated by reference herein and made a part of this specification.

TECHNICAL FIELD

The present invention relates to the technical field of energy reuse and energy saving, in particular to an electric boiler device based on utilization of residual energy of an elevator, and a control method.

BACKGROUND

During running of an elevator, when its car goes up at underload (a weight of the car is less than a counterweight), or goes down at overload (the weight of the car is greater than the counterweight) or brakes, a tractor is likely to be in a power generation state, and generates unstable currents. At present, instead of reasonable use of this electric energy, most running elevators convert electric energy into heat energy and directly consumes same by externally connecting a direct current bus of the elevator to an energy consumption resistor. The residual energy is mainly recycled currently by researchers as follows: (1) the electric energy is stored through a supercapacitor, etc. (such as patents CN217183015U, CN110436283A and CN207573088U); (2) the electric energy is added into a power grid by adding an energy feedback device (patents CN111908309A, CN210297270U and CN207459742U); and (3) the residual energy of the elevator is stored as electric energy first, and then converted into heat energy of water for users (for example, patent CN114940427A). However, the above methods all require development of special residual energy storage devices or energy feedback control systems, and improvement in an original elevator control system, which will greatly increase an investment cost.

Apart from that, energy saving and consumption reduction of electric boiler products is urgent to be solved in practical production. If the residual energy of the elevator and the electric boiler products are organically combined, important practical significance will be achieved for efficient utilization of energy and energy saving and consumption reduction.

SUMMARY OF THE DISCLOSURE

In order to solve the above problems, the present invention provides an electric boiler device based on utilization of residual energy of an elevator and a control method. The residual energy generated during elevator running is converted into heat energy of water for being stored, and water source preheating is further provided for an electric boiler; and according to a user-set water supply temperature of the electric boiler, preheated water is electrically heated, thereby reducing an energy consumption cost of the electric boiler and providing a user with a low-cost hot water service. A problem to be solved is to change the residual energy of the elevator into heat energy of the electric boiler without changing conditions of an original control system of the elevator, so as to recycle the residual energy of the elevator product and achieve energy saving and consumption reduction of the electric boiler product.

The present invention provides an electric boiler device based on utilization of residual energy of an elevator. The device includes a heat storage module, an electric heating module and a control module.

The heat storage module converts the residual energy generated by the elevator, and the residual energy generated by the elevator is converted, through a preheating unit in the module, into heat energy of water for being stored, which is also a process of preheating the electric boiler.

The electric heating module is configured to perform an electric heating function, and electrically heat preheated water input by the heat storage module to a water supply temperature set by a user, so as to satisfy a hot water requirement from the user.

The control module is configured to collect and receive a water temperature and a water level of water in the above two modules, and feed the water temperature and water level information back to a water level control unit and a water temperature control unit, so as to give control instructions on water replenishment or electric heating under different water temperature and water level setting conditions.

The heat storage module is electrically connected to a tractor.

Further, the heat storage module includes a heat storage water tank and a water replenishment unit, a preheating unit, a first information collection unit and a first pressure release unit that are arranged on the heat storage water tank.

Further, the heat storage water tank is a space for storing heat energy for the heat storage module, a place for converting the residual energy of the elevator into the heat energy of water and a container for storing a preheated water source.

The water replenishment unit is a water inlet valve, the water inlet valve is in communication with a tap water pipe network, and under the condition that a water level of the heat storage water tank is lower than a set water level, water is replenished to raise the water level to the set water level and perform a water replenishment function.

The preheating unit is a first resistive electric heater, and the residual energy of the elevator is released and utilized through an energy consumption resistor and converted into heat energy of water, such that the water in the heat storage water tank is preheated.

The first information collection unit is a first water temperature and water level sensor, and is configured to collect and transmit a water temperature and a water level in the heat storage water tank to a signal reception unit of the control module.

The first pressure release unit is a first pressure release valve, and under the condition that the water temperature of the heat storage water tank of the heat storage module rises, and causes an excessively high pressure of the heat storage water tank, the pressure release valve of the water tank is triggered to discharge steam from the water tank, so as to reduce the pressure of the heat storage water tank.

Further, a frequency conversion and voltage transformation module is arranged between the heat storage module and the tractor of the elevator, the frequency conversion and voltage transformation module includes a rectifier, an inverter and a transformer, an input end of the frequency conversion and voltage transformation module is connected to an output end for generating electric energy of the tractor of the elevator, an output end of the frequency conversion and voltage transformation module is connected to the heat storage module, the rectifier is configured to covert an unstable current output by the tractor into a direct current, the inverter is configured to convert the direct current into an alternating current, and the transformer is configured to maintain a stable frequency and voltage.

Further, the electric heating module includes a heating water tank and a water replenishment and supply unit, a heating unit, a second information collection unit and a second pressure release unit that are arranged on the heating water tank.

Further, the heating water tank is a place where the electric heating module electrically heats water and a container for storing hot water.

The water replenishment and supply unit includes a water inlet pump and a water supply valve, the water inlet pump is in communication with the heat storage water tank and the heating water tank, the water supply valve is in communication with the heating water tank and the user water supply pipe network, and the water replenishment and supply unit performs functions of water replenishment and hot water supply for a user according to a hot water usage condition of the user. Under the condition that a water level of the heating water tank drops, the water replenishment and supply unit delivers preheated water in the heat storage water tank to the heating water tank, and raises the water level to the set water level, so as to perform the water replenishment function.

The heating unit is a second resistive electric heater, and performs electric heating, as to electrically heat the heating water tank to a user-set temperature.

The second information collection unit is a second water temperature and water level sensor, and is configured to collect and transmit a water temperature and a water level in the heating water tank to the signal reception unit of the control module.

The second pressure release unit is a second pressure release valve, and under the condition that the water temperature of the heating water tank of the electric heating module rises, and causes an excessively high pressure of the heating water tank, the pressure release valve of the water tank is triggered to discharge steam from the water tank, so as to reduce the pressure of the heating water tank.

Further, the control module includes a signal reception unit, a water level control unit and a water temperature control unit, and is configured to receive water temperatures and water levels of the above two modules, issue water temperature and water level control instructions, and perform water temperature and water level control functions.

The signal reception unit is configured to receive a water temperature signal and a water level signal of sensors in the heat storage water tank and the heating water tank, and feed the signals back to the water level control unit and the water temperature control unit; and the signal reception unit includes a single-chip microcomputer, a minimum single-chip microcomputer system, a water tank temperature sensor sub-module and a water tank water level sensor sub-module.

The water level control unit is configured to issue a water level control signal to control the water inlet valve of the heat storage water tank and the water inlet pump of the heating water tank to be opened or closed, so as to perform a water level adjustment function of the water tank; and the water level control unit includes a heat storage water tank water inlet valve control sub-module and a heating water tank water inlet pump control sub-module.

The water temperature control unit is configured to issue a water temperature control signal to control an electric heater in the heating water tank to be turned on or off, so as to perform a water temperature adjustment function of the water tank; and the water temperature control unit is a heating water tank heating control sub-module.

The control module issues corresponding water temperature and water level control instructions according to water temperatures and water levels in the heat storage water tank and the heating water tank to perform water temperature and water level adjustment functions; and the control module is connected to the first water temperature and water level sensor, the first resistive electric heater and the water inlet valve of the heat storage water tank, and is connected to the second water temperature and water level sensor, the second resistive electric heater and the water inlet pump of the heating water tank.

The present invention further provides a control method for the electric boiler device based on utilization of residual energy of an elevator described above. The control method includes a specific process as follows:

connecting a heat storage module to a tap water pipe network, inputting tap water, performing functions of conversion, storage and boiler preheating of the residual energy of the elevator, and collecting and transmitting a water temperature and a water level of the heat storage water tank to a control module by a first information collection unit in the heat storage module; under the condition that a water level of a heat storage water tank is lower than a set threshold, issuing an instruction by the control module, performing water replenishment by a water replenishment unit to raise the water level to a set water level and performing a water replenishment function; and releasing, by a preheating unit, the residual energy of the elevator through an energy consumption resistor, converting the residual energy into heat energy of water, and preheating water in the heat storage water tank;

connecting an electric heating module to the heat storage water tank of the heat storage module, inputting water preheated by the heat storage module, implementing an electric heating function in a heating water tank according to a set water supply temperature, and providing hot water service for a user; collecting and transmitting a water temperature and a water level of the electric heating module to the control module by a second information collection unit in the electric heating module, and performing a water replenishment and supply function by a water replenishment and supply unit according to hot water use condition of the user; under the condition that a water level of the heating water tank of the electric heating module drops, issuing an instruction by the control module, turning on a water supply pump of the water replenishment and supply unit, delivering a preheated water resource in the heat storage water tank to the heating water tank of the electric heating module and performing a water replenishment function; under the condition that a water level of the heating water tank rises to a set water level, stopping water replenishment, and under the condition that a water temperature of the heating water tank is lower than a set temperature, turning on a power switch of a heating unit, and heating the heating water tank through a second resistive electric heater; and under the condition that a water temperature of the heating water tank rises to a user-set temperature, turning off a power switch of a heating unit and stopping operation thereof.

Further, during water replenishment of the heat storage module, a multi-water-level dynamic adjustment water replenishment method is adopted, a multi-stage water replenishment strategy is selected between a lowest water level and a highest water level of the heat storage water tank, and the control module performs a dynamic adjustment function of the set water level according to a real-time water level and a real-time water temperature of the heat storage water tank and a user-set water temperature, and controls a water inlet valve of the heat storage water tank to be opened or closed, such that effective conversion of the residual energy of the elevator is guaranteed, a preheating effect of the electric boiler is achieved, and energy saving and consumption reduction are achieved.

According to the present invention, in order to solve the problem of dual requirements of elevator residual energy utilization and electric boiler product energy saving and consumption reduction, the electric boiler device based on utilization of residual energy of an elevator and the control method are provided. According to the present invention, without changes in the original control system of the elevator product, the residual energy of the elevator is directly converted into the heat energy of water by adding the heat storage water tank for the electric boiler, based on the features of non-uniformity and uncertainty of residual energy production of the elevator, the multi-water-level dynamic adjustment water supplement strategy is adopted to provide an efficient control method for preheating the electric heat boiler, so as to conveniently store and efficiently utilize the residual energy of the elevator and achieve energy saving and consumption reduction of the electric boiler.

In the figures: 1. heat storage module; 11. water inlet valve; 12. first resistive electric heater; 13. heat storage water tank; 14. first water temperature and water level sensor; 15. first pressure release valve; 2. electric heating module; 21. water inlet pump; 22. heating water tank; 23. second resistive electric heater; 24. second water temperature and water level sensor; 25. water supply valve; 26. second pressure release valve; 3. control module; 31. single-chip microcomputer; 32. water tank temperature sensor sub-module; 33. water tank water level sensor sub-module; 34. water inlet valve control sub-module; 35. water inlet pump control sub-module; 36. heating control sub-module; 37. upper computer; 38. analog-to-digital (A/D) converter; 4. frequency conversion and voltage transformation module; 5. tractor; 6. tap water pipe network; 7. user water supply pipe network; and 8. power supply.

DETAILED DESCRIPTION OF THE EMBODIMENTS

The technical solutions of the patent for the present invention will be described below clearly and comprehensively in conjunction with accompanying drawings. Apparently, examples described are merely some examples rather than all examples of the present invention. All other examples derived by a person of ordinary skill in the art based on the examples of the present invention without creative efforts shall fall within the protection scope of the present invention.

In the description of the present invention, it should be noted that the orientation or positional relationships indicated by the terms such as "center", "up", "down", "left", "right", "vertical", "horizontal", "inside" and "outside", if used, are based on the orientation or positional relationship shown in the accompanying drawings and are merely for facilitating the description of the present invention and simplifying the description, rather than indicating or implying that a device or element referred to must have a particular orientation or be constructed and operated in a particular orientation, and shall not be interpreted as limitation to the present invention as a result. In addition, the terms such as "first", "second" and "third", if used, are merely used for describing purposes and shall not be understood as indicating or implying relative importance.

In the description of the present invention, it should be noted that, unless otherwise explicitly specified and defined, the terms such as "mount", "connecting" and "connection", if used, should be understood in a broad sense. For example, a connection can be a fixed connection, a detachable connection or an integrated connection, can be a mechanical connection or an electric connection, can be a direct connection or an indirect connection through an intermediate medium, and can be internal communication of two elements. For those of ordinary skill in the art, specific meanings of the above terms in the present invention can understood according to specific circumstances.

Figure 1:
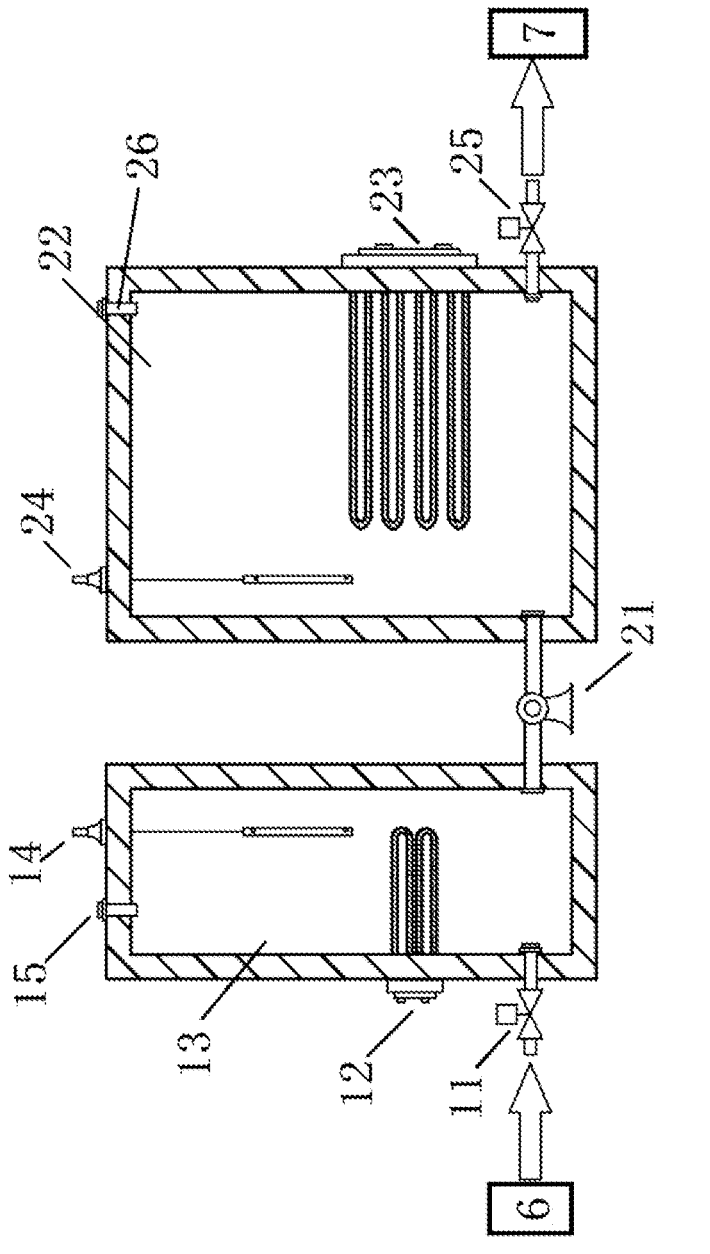
FIG. 1 is a schematic diagram of an electric boiler device according to the present invention.
Figure 2:
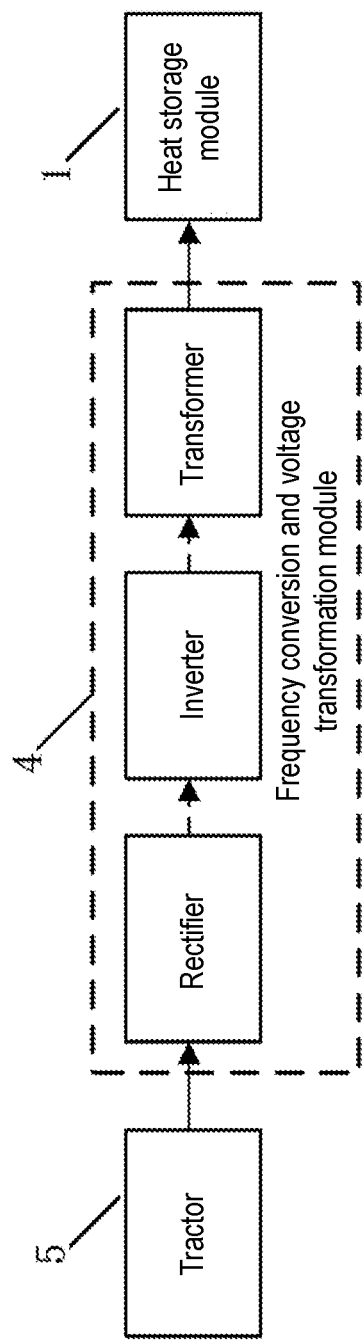
FIG. 2 is a schematic diagram of a frequency conversion and voltage transformation module.
Figure 3:
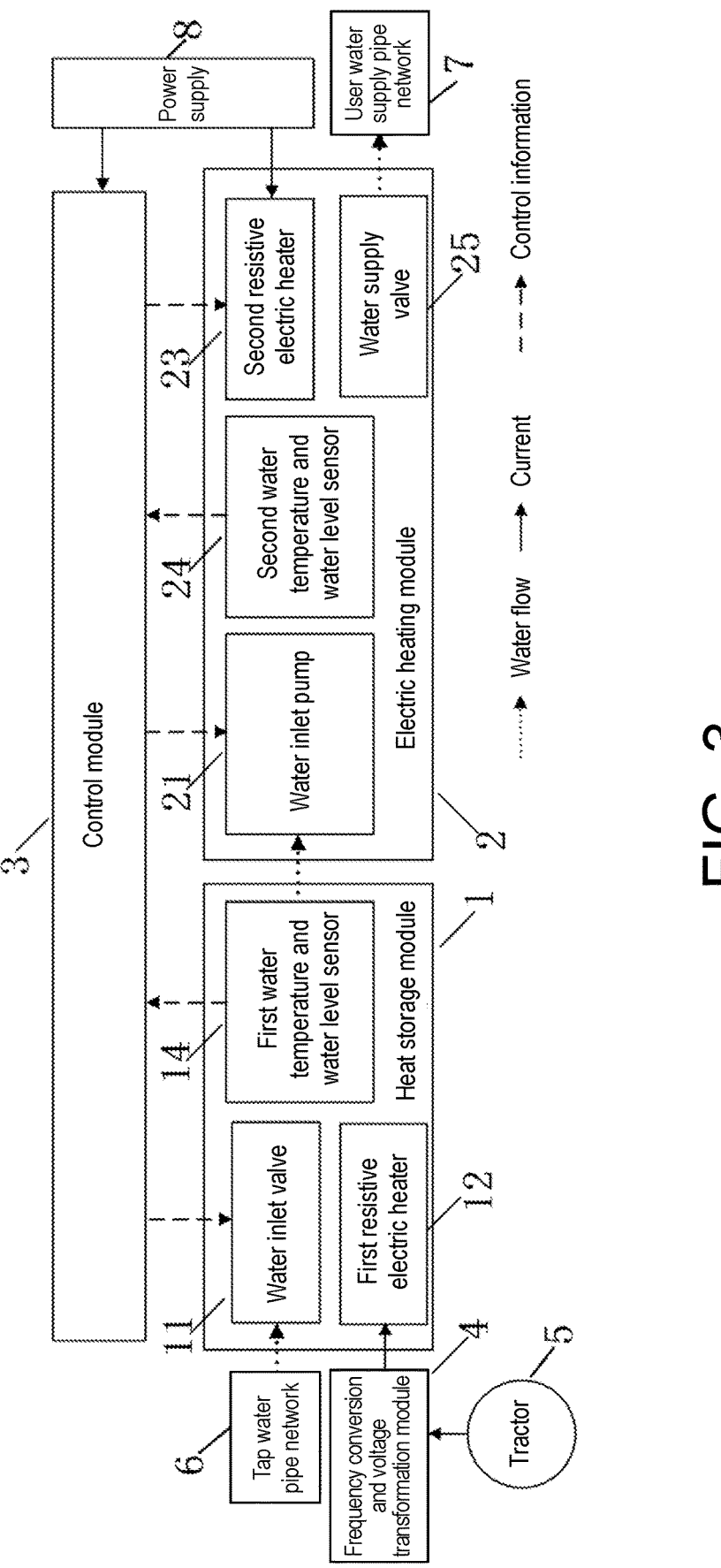
FIG. 3 is a schematic diagram of a process flow of a heat storage module and an electric heating module.

With reference to FIGS. 1-3, an electric boiler device based on utilization of residual energy of an elevator provided by the present invention provides includes a heat storage module 1, an electric heating module 2 and a control module 3. The composition and embodiments of the device will be described in detail below with reference to the accompanying drawings.

FIG. 1 shows a schematic diagram of an electric boiler device, in which composition and a specific workflow of the apparatus are shown. The heat storage module 1 includes a water inlet valve 11, a first resistive electric heater 12, a heat storage water tank 13, a first water temperature and water level sensor 14 and a first pressure release valve 15. The electric heating module 2 includes a water inlet pump 21, a heating water tank 22, a second resistive electric heater 23, a second water temperature and water level sensor 24, a water supply valve 25 and a second pressure release valve 26.

In order to guarantee that an unstable current generated by a tractor of the elevator is converted into a stable current when the heat storage module 1 is energized with the residual energy of the elevator, a frequency conversion and voltage transformation module 4 is added between the elevator and the electric boiler device. As shown in FIG. 2, the frequency conversion and voltage transformation module 4 is composed of a rectifier, an inverter and a transformer. An input end of the frequency conversion and voltage transformation module is connected to an output end for generating electric energy of the tractor 5 of the elevator. An output end of the frequency conversion and voltage transformation module is connected to the heat storage module 1 of the device. The rectifier is configured to covert an unstable current output by the tractor 5 into a direct current. The inverter is configured to convert the direct current into an alternating current. The transformer is configured to maintain a stable frequency and voltage.

The residual energy produced by the tractor 5 of the elevator performs rectification, inversion and frequency conversion on the unstable current through the frequency conversion and voltage transformation module 4. The current is then input into the first resistive electric heater 12 of the heat storage module 1 to continuously heat stored water in the heat storage water tank 13. The control module 3 can receive signals from the first water temperature and water level sensor 14 and the second water temperature sensor 24, take corresponding water supplement measures according to different situations, and output corresponding commands, so as to guarantee water temperatures and water levels of the heating water tank 22 and the heat storage water tank 13. For example, when the water level is lower than a set threshold, a water replenishment command on turning on the water inlet valve 11 of the heat storage water tank 13 is issued for replenishing the heat storage water tank with water. When the water level of the heating water tank 22 is lower than a set threshold, a water replenishment command on turning on the water inlet pump 21 of the heating water tank 22 is issued for replenishing the heating water tank 22 with water. When the second water temperature and water level sensor 24 of the heating water tank 22 detects that the water temperature is lower than a user-set threshold, a command on turning on the second resistive electric heater 23 of the heating water tank 22 is issued for heating the heating water tank 22 to a user-set temperature. Finally, a hot water service is provided for a user through the water supply valve 25 of the heating water tank 22.

FIG. 3 is a schematic composition diagram of a heat storage module and an electric heating module. The heat storage module 1 is composed of a heat storage water tank 13, a water replenishment unit, a preheating unit, a first information collection unit and a first pressure release unit. The heat storage water tank 13 is a water storage unit for the entire heat storage module, the water replenishment unit is a water inlet valve 11, and the water inlet valve 11 is in communication with a tap water pipe network 6. The preheating unit is a first resistive electric heater 12, the first information collection unit is a first water temperature and water level sensor 14, and the first pressure release unit is a first pressure release valve 15.

The module converts electric energy generated by the elevator into heat energy of water and stores same. The water inlet valve 11 of the heat storage water tank 13 is connected to the tap water pipe network 6, and the water outlet end is connected to the heating water tank 22 of the electric heating module 2. The first resistive electric heater 12 is connected to a current output end of the frequency conversion and voltage transformation module 4.

Further, the heat storage water tank 13 is a main water storage apparatus of the module. The first water temperature and water level sensor 14 is used to monitor a water temperature and a water level of the heat storage water tank 13 and transmit a water temperature signal and a water level signal to the control module 3. The first resistive electric heater 12 is a main heating apparatus of the module. The water inlet valve 11 is used for replenishing the heat storage water tank 13 with water. The first pressure release valve 15 releases a pressure of the heat storage water tank 13 when the heat storage water tank 13 is in a high pressure state.

The electric heating module 2 includes a heating water tank 22 and a water replenishment and supply unit, a heating unit, a second information collection unit and a second pressure release unit that are arranged on the heating water tank 22. The heating water tank 22 is a water storage unit for the entire module. The water replenishment and supply unit includes a water inlet pump 21 and a water supply valve 25. The water inlet pump 21 is in communication with the heat storage water tank 13 and the heating water tank 22, and the water supply valve 25 is in communication with the heating water tank 22 and a user water supply pipe network 7. The heating unit is a second resistive electric heater 23, the second information collection unit is a second water temperature and water level sensor 24, and the second pressure release unit is a second pressure release valve 26. The module electrically heats the heating water tank 22 to a set temperature, and provide the hot water service for the user. The water inlet pump 21 of the heating water tank 22 is connected to a water outlet end of the heat storage water tank 13, and the water supply valve 25 is connected to the user water supply pipe network 7. The second resistive electric heater 23 is connected to a power supply 8.

Further, the heating water tank 22 is a main water storage apparatus of the module. The second water temperature and water level sensor 24 is used to monitor a water temperature and a water level of the heating water tank and transmit a water temperature signal and a water level signal to the control module 3. The second resistive electric heater 23 is a main heating apparatus for electric heating. The water inlet pump 21 is used for replenishing the heating water tank 22 with water from the heat storage water tank 13. The second pressure release valve 26 releases a pressure of the heating water tank 22 when the heating water tank 22 is in a high pressure state. The water supply valve 25 is used to be connected to or disconnected from the user water supply pipe network 7 and provides the hot water service for the user.

Figure 4:
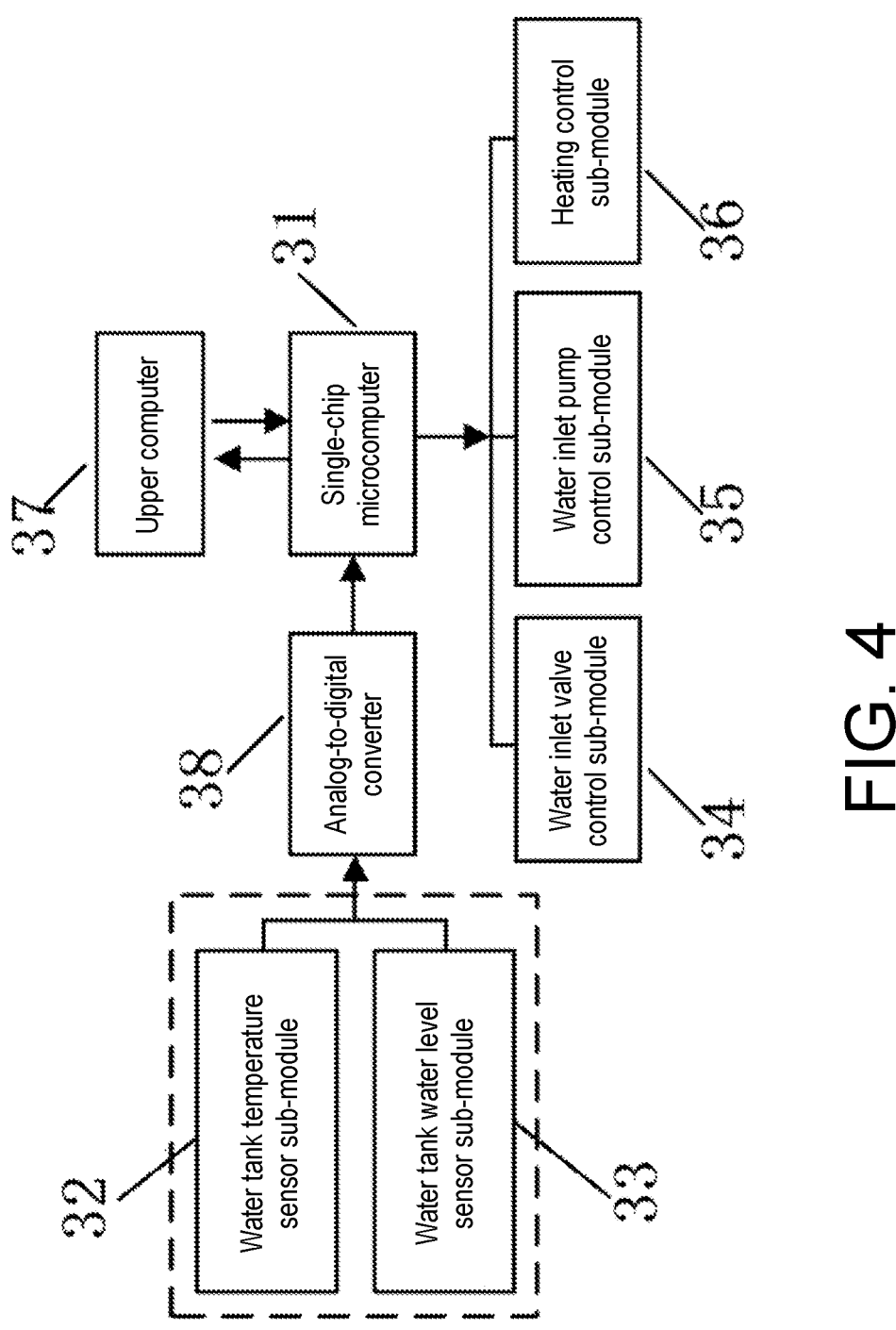
FIG. 4 is a schematic diagram of a control module.

FIG. 4 is a schematic composition diagram of a control module 3. The module includes a signal reception unit, a water level control unit and a water temperature control unit. The signal reception unit is composed of a single-chip microcomputer 31, a minimum single-chip microcomputer system, a water tank temperature sensor sub-module 32 and a water tank water level sensor sub-module 33. The water level control unit is composed of a heat storage water tank water inlet valve control sub-module 34 and a heating water tank water inlet pump control sub-module 35. The water temperature control unit is mainly composed of a heating water tank heating control sub-module 36. The single-chip microcomputer 31 is connected to the upper computer 37, and A/D converters 38 are arranged between the water tank temperature sensor sub-module 32 and the single-chip microcomputer 31 and between the water tank water level sensor sub-module 33 and the single-chip microcomputer. The control module 3 issues corresponding water temperature and water level control instructions according to water temperatures and water levels in the heat storage water tank 13 and the heating water tank 22 to perform water temperature and water level adjustment functions. The control module 3 is connected to the first water temperature and water level sensor 14, the first resistive electric heater 12 and the water inlet valve 11 of the heat storage water tank 13, and is connected to the second water temperature and water level sensor 24, the second resistive electric heater 23, the water inlet pump 21 and the water supply valve 25 of the heating water tank 22.

Further, the minimum single-chip microcomputer system includes a power supply, a crystal oscillator circuit and a reset circuit, and is a system for guaranteeing a normal operation of the single-chip microcomputer. The water tank temperature sensor sub-module 32 is used for processing the temperature signal and feeding back an instruction, and is connected to the temperature sensors of the heat storage water tank 13 and the heating water tank 22. The water tank water level sensor sub-module 33 is used for processing the water level signal and feeding back an instruction, and is connected to the water level sensors of the heat storage water tank 13 and the heating water tank 22. The heat storage water tank water inlet valve control sub-module 34 is used for controlling water inlet of the heat storage water tank 13 and is connected to the water inlet valve 11 of the heat storage water tank. The heating water tank water inlet pump control sub-module 35 is used for controlling water inlet of the heating water tank and is connected to the water inlet pump 21 of the heating water tank 22. The heating water tank heating control sub-module 36 is used for controlling electric heating of the heating water tank 22 and is connected to the second resistive electric heater 23 of the heating water tank 22.

Figure 5:
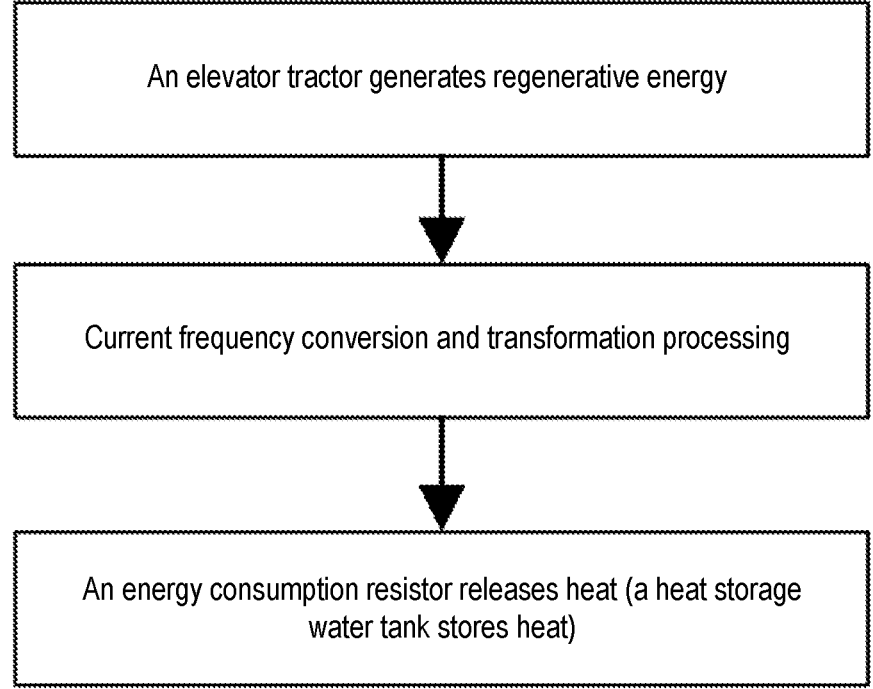
FIG. 5 is a flowchart showing residual energy utilization of an elevator.

FIG. 5 shows a diagram showing a principle of residual energy utilization of an elevator. That is, a process in which the elevator generates residual energy and converting same into heat energy of a heat storage water tank. During running of the elevator, when a car goes up at underload (a weight of the car is less than a counterweight), or goes down at overload (the weight of the car is greater than the counter-weight) or brakes, a tractor is likely to be in a power generation state, and generates unstable currents. A rectifier coverts an unstable current output by the tractor into a direct current. The inverter converts the direct current into an alternating current. A transformer maintains a stable frequency and voltage. Treated electric energy heats the heat storage water tank 13 through the energy consumption resistor of the elevator, thereby performing functions of residual energy conversion and heat energy storage.

Figure 6:
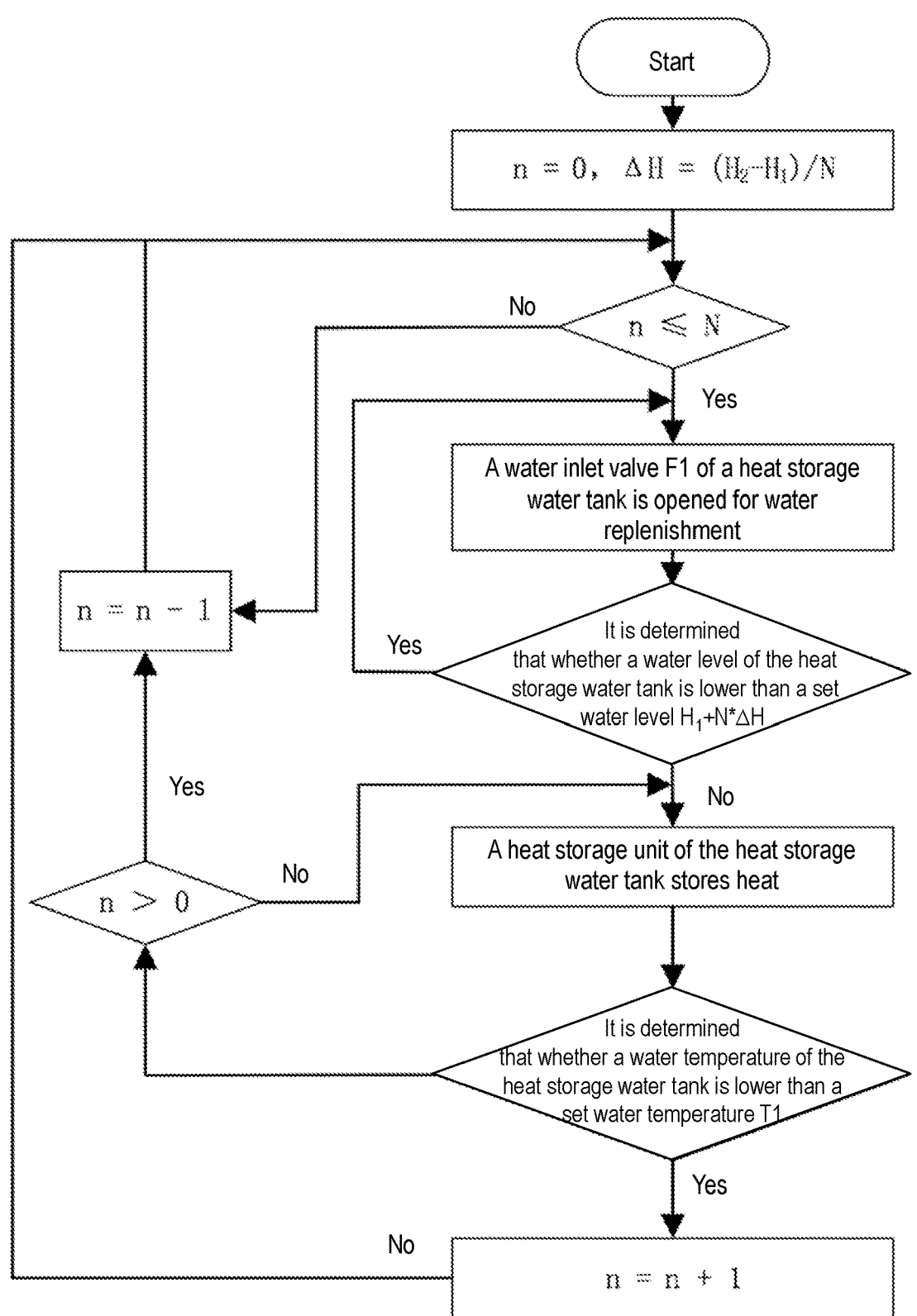
FIG. 6 is a flowchart of a multi-stage water replenishment strategy for a heat storage water tank.

FIG. 6 shows a flowchart of a multi-water-level dynamic adjustment water replenishment strategy for a heat storage water tank, in which a process of water replenishment and heating of the heat storage water tank is shown. where N represents a preset water replenishment stage, n represents a current water replenishment stage, ΔH represents a water level height of each stage, $H_1$ represents a lowest water level of the heat storage water tank, and $H_2$ represents a highest water level of the heat storage water tank. The heat storage water tank 13 is connected to the tap water pipe network 6, and tap water is used as an input water source. First, the water inlet valve 11 of the heat storage module 1 is opened to replenish the water tank with water. Whether the water level of the heat storage water tank 13 reaches a set threshold value $H_1$ is determined by the water level sensor, if not, water replenishment continues until the water level reaches $H_1$, and the water inlet valve 11 is turned off.

Because of the uncertainty of the residual energy of the elevator, in order to take into account the utilization efficiency of the residual energy of the elevator and a preheating effect of the electric boiler, it is necessary to determine the water level and the water temperature in the heat storage water tank, implement a water level dynamic adjustment replenishment mechanism and control water replenishment of the water tank.

The water level dynamic adjustment water replenishment mechanism adopted has specific benefits as follows: (1) a water storage space of the water storage tank is planned reasonably; (2) since the residual energy generated by the elevator is intermittent and irregular, the device will convert the residual energy into heat energy of water in time, but if not used for a long time, the water in the water storage module will continue to heat up, and the water temperature of the water storage tank can be limited to a certain temperature range according to multi-water-level adjustment, thereby reducing a steam pressure in the module; and (3) maximum utilization of energy is ensured, that is, the residual energy of the elevator is converted into the heat energy of water.

Figure 7:
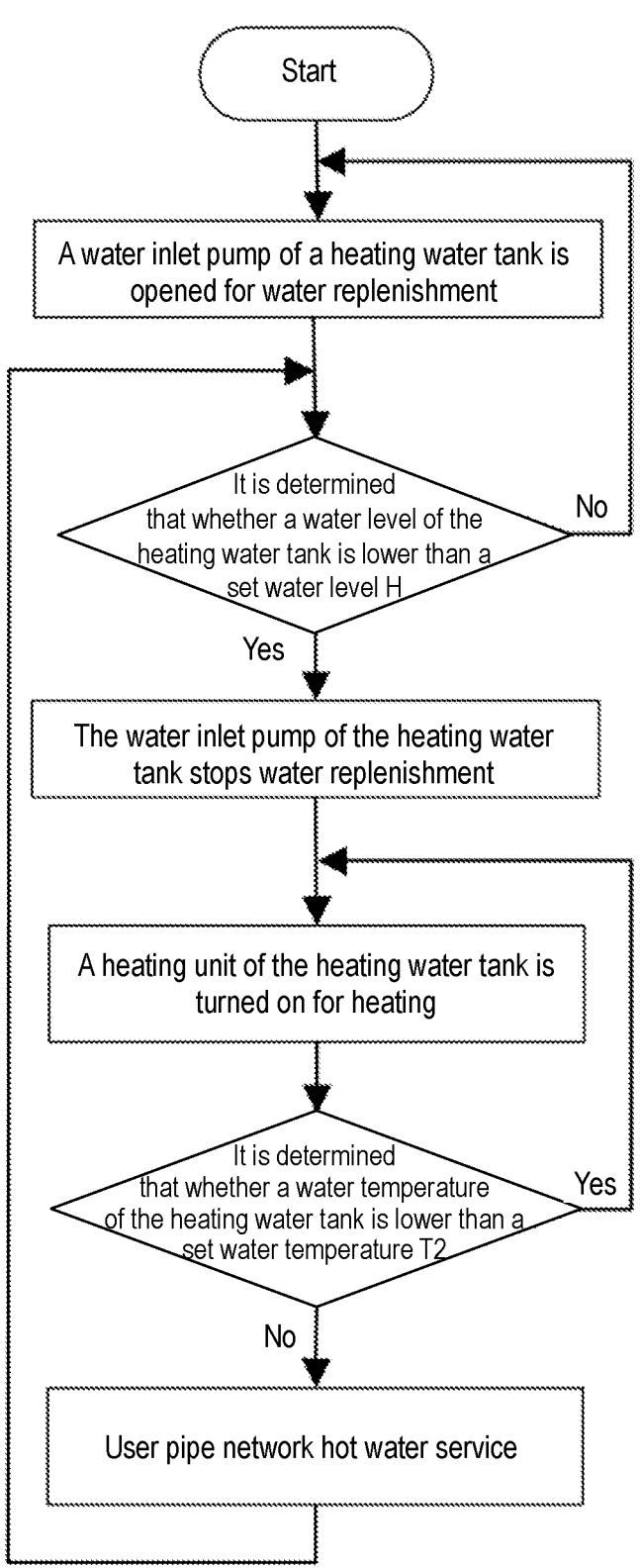
FIG. 7 is a flowchart of an operation principle of an electric heating module.

FIG. 7 shows a flowchart of an operation principle of an electric heating module. When the water level of the heating water tank is lower than the set water level H, the control module 3 issues an instruction on turning on the water inlet pump 21 of the heating water tank for replenishing the heating water tank 22 with water. When the water temperature is lower than a user-set temperature T2, the control module 3 issues a turn-on instruction, and the second resistive electric heater 23 is connected to the power supply to heat the heating water tank 22 until the water temperature rises to the user-set temperature T2.

Corresponding control measures in different operation scenarios are described below.

A size of the apparatus is preset, such as a heat storage water tank with a bottom area of 1 m$^2$ and a height of 1.5 m. A highest water level of 1.4 m and a lowest water level of 0.8 m are set. A highest water temperature threshold of 70° C. (generally less than or equal to the set temperature of the heating water tank) of the heat storage water tank is set. The bottom area of 1 m$^2$ and the height of 1.5 m of the heating water tank are set. The highest water level is set to 1.4 m and the maximum water temperature threshold of the heating water tank is set to 70° C.

Under the above conditions, FIG. 6 shows a four-water-level (n=4) dynamic setting water replenishment control method of a heat storage module. The electric energy generated during elevator running is directly transmitted to the first resistive electric heater 12 in the heat storage water tank after being subjected to rectification, inversion and frequency conversion, and is converted into heat energy in the heat storage water tank. The water temperature sensor of the heat storage water tank monitors a water temperature signal. In particular, four-water-level dynamic setting water replenishment strategies under different conditions are as follows:

1) An initial set water level is the lowest water level (first water level) of 0.8 m If the water level of the heat storage water tank is lower than the set lowest water level of 0.8 m, the control module re-executes the command on opening the water inlet valve of the heat storage water tank, and water replenishment is performed to the lowest water level (first water level) of 0.8 m.

2) If a set water level is the lowest water level (first water level) of 0.8 m (1) When the water temperature is higher than the set temperature 70° C. of the heat storage water tank, the control module re-executes the command on opening the water inlet valve of the heat storage water tank, and water replenishment is performed to a second water level of 1 m, and the set water level is adjusted to the second water level 1 m.

(2) If the water temperature is lower than the set temperature 70° C. of the heat storage water tank, the set water level is not adjusted.

3) If a set water level is the second water level of 1 m (1) When the water temperature is higher than the set temperature 70° C. of the heat storage water tank:

1. If the water level is not lower than the second water level of 1 m in this case, water replenishment is implemented to a third water level of 1.2 m, and the set water level is adjusted to the third water level of 1.2 m.

2. If the water level is lower than the second water level of 1 m and higher than or equal to the lowest water level (first water level) of 0.8 m in this case, water replenishment is implemented to the second water level of 1 m, and the set water level is not adjusted.

3. If the water level is lower than the lowest water level of 0.8 m in this case, water replenishment is implemented to the lowest water level (first water level) of 0.8 m, and the set water level is adjusted to the lowest water level (first water level) of 0.8 m.

(2) When the water temperature is lower than the set temperature 70° C. of the heat storage water tank:

1. If the water level is lower than the second water level of 1 m and higher than or equal to the lowest water level (first water level) of 0.8 m in this case, water replenishment is implemented to the second water level of 1 m, and the set water level is not adjusted.

2. If the water level is lower than the lowest water level of 0.8 m in this case, water replenishment is implemented to the lowest water level (first water level) of 0.8 m, and the set water level is adjusted to the lowest water level (first water level) of 0.8 m.

4) If a set water level is the third water level of 1.2 m (1) When the water temperature is higher than the set temperature 70° C. of the heat storage water tank:

1. If the water level is not lower than the third water level of 1.2 m in this case, water replenishment is implemented to a fourth water level (highest water level) of 1.4 m, and the set water level is adjusted to the fourth water level (highest water level) of 1.4 m.

2. If the water level is lower than the third water level of 1.2 m and higher than or equal to the second water level of 1 m in this case, water replenishment is implemented to the third water level of 1.2 m, and the set water level is not adjusted.

3. If the water level is lower than the second water level of 1 m and higher than or equal to the lowest water level (first water level) of 0.8 m in this case, water replenishment is implemented to the second water level of 1 m, and the set water level is adjusted to the second water level of 1 m.

4. If the water level is lower than the lowest water level of 0.8 m in this case, water replenishment is implemented to the lowest water level (first water level) of 0.8 m, and the set water level is adjusted to the lowest water level (first water level) of 0.8 m.

(2) When the water temperature is lower than the set temperature 70° C. of the heat storage water tank:

1. If the water level is lower than the third water level of 1.2 m and higher than or equal to the second water level of 1 m in this case, water replenishment is implemented to the third water level of 1.2 m, and the set water level is not adjusted.

2. If the water level is lower than the second water level of 1 m and higher than or equal to the first water level of 0.8 m in this case, water replenishment is implemented to the second water level of 1 m, and the set water level is adjusted to the second water level of 1 m.

3. If the water level is lower than the lowest water level of 0.8 m in this case, water replenishment is implemented to the lowest water level (first water level) of 0.8 m, and the set water level is adjusted to the lowest water level (first water level) of 0.8 m.

5) If a set water level is the fourth water level (highest water level) of 1.4 m (1) When the water temperature is higher than the set temperature 70° C. of the heat storage water tank:

1. If the water level is lower than the fourth water level (highest water level) of 1.4 m and higher than or equal to the third water level of 1.2 m in this case, water replenishment is implemented to the fourth water level (highest water level) of 1.4 m, and the set water level is not adjusted.

2. If the water level is lower than the third water level of 1.2 m and higher than or equal to the second water level of 1 m in this case, water replenishment is implemented to the third water level of 1.2 m, and the set water level is adjusted to the third water level of 1.2 m.

3. If the water level is lower than the second water level of 1 m and higher than or equal to the lowest water level (first water level) of 0.8 m in this case, water replenishment is implemented to the second water level of 1 m, and the set water level is adjusted to the second water level of 1 m.

4. If the water level is lower than the lowest water level of 0.8 m in this case, water replenishment is implemented to the lowest water level (first water level) of 0.8 m, and the set water level is adjusted to the lowest water level (first water level) of 0.8 m.

(2) When the water temperature is lower than the set temperature 70° C. of the heat storage water tank:

1. If the water level is lower than the fourth water level (highest water level) of 1.4 m and higher than or equal to the third water level of 1.2 m in this case, water replenishment is implemented to the fourth water level (highest water level) of 1.4 m, and the set water level is not adjusted.

2. If the water level is lower than the third water level of 1.2 m and higher than or equal to the second water level of 1 m in this case, water replenishment is implemented to the third water level of 1.2 m, and the set water level is adjusted to the third water level of 1.2 m.

3. If the water level is lower than the second water level of 1 m and higher than or equal to the first water level of 0.8 m in this case, water replenishment is implemented to the second water level of 1 m, and the set water level is adjusted to the second water level of 1 m.

4. If the water level is lower than the lowest water level of 0.8 m in this case, water replenishment is implemented to the lowest water level (first water level) of 0.8 m, and the set water level is adjusted to the lowest water level (first water level) of 0.8 m.

Especially, when the water temperature of the heat storage water tank is higher than 70° C. set for the heat storage water tank, and the water level reaches the highest water level at the same time, if the pressure of the tank is too high, the first pressure release valve 15 of the water tank is likely to be triggered to release the pressure of the water tank, so as to prevent an excessively-high steam pressure in the heat storage water tank from influencing the water tank.

Under the above conditions, FIG. 7 shows a water level and water temperature control method for an electric heating module 2. When a water level and a water temperature of the heating water tank change, a water level signal and a water temperature signal monitored by the second water level and water temperature sensor 24 in the water tank are transmitted to the control module 3. When the user opens the water supply valve 25 to use hot water, the water level of the heating water tank drops, and the control module performs water replenishment and electric heating operations according to the water level and water temperature. A specific control flow is as follows:

1) When the water level of the water tank is lower than the set water level of 1.4 m, the instruction on turning on the water inlet pump 21 of the heating water tank is re-executed for replenishing the heating water tank 21 with water.

2) When the water level reaches the set water level of 1.4 m, an instruction on turning off the water inlet pump 21 of the heating water tank is re-executed for turning off the water inlet valve 21 and stopping water replenishment.

(3) When the water temperature is lower than the user-set temperature 70° C.: The second water level and water temperature sensor 24 of the heating water tank transmits the temperature to the control module 3, and a command on turning on the second resistive heater 23 of the heating water tank is re-executed for heating the heating water tank 22.

4) When the water temperature reaches the user-set temperature of 70° C., the second water level and water temperature sensor 24 transmits the water temperature signal to the control module, and a command on turning off the second resistive heater 23 of the heating water tank is re-executed for stopping heating.

Especially, when the pressure of the heating water tank 22 is too high, the second pressure release valve 24 of the heating water tank is triggered to release the pressure of the water tank, so as to reduce the influence of the excessive steam pressure on the water tank.

What are described in the examples of the description are merely enumerations of implementation forms of the inventive concept, the protection scope of the present invention should not be regarded as limited to specific forms stated in the examples, and the protection scope of the present invention shall cover equivalent technical means that are conceivable by those skilled in the art according to the concept of the present invention.

What is claimed is:

1. An electric boiler device based on utilization of residual energy of an elevator, comprising a heat storage module, an electric heating module and a control module electrically connected to one another, wherein the heat storage module is configured to convert the residual energy generated by the elevator into heat energy of water for being stored in a process of preheating the electric boiler;

the electric heating module is configured to perform an electric heating function, and electrically heat preheated water input by the heat storage module to a water supply temperature set by a user, so as to satisfy a hot water requirement from the user;

the control module is configured to collect and receive water temperatures and water levels of water in the heat storage module and water in the electric heating module, and issue corresponding control instructions according to the water temperature and the water level to control water replenishing or electric heating under different water temperature and water level setting conditions; and the heat storage module is electrically connected to a tractor.

2. The electric boiler device based on utilization of residual energy of the elevator according to claim 1, wherein the heat storage module comprises a heat storage water tank and a water replenishment unit, a preheating unit, a first information collection unit and a first pressure release unit that are arranged on the heat storage water tank.

3. The electric boiler device based on utilization of residual energy of the elevator according to claim 2, wherein the heat storage water tank is a water storage unit for the entire heat storage module, the water replenishment unit is a water inlet valve, the water inlet valve is in communication with a tap water pipe network, the preheating unit is a first resistive electric heater, the first information collection unit is a first water temperature and water level sensor, and the first pressure release unit is a first pressure release valve.

4. The electric boiler device based on utilization of residual energy of the elevator according to claim 1, wherein a frequency conversion and voltage transformation module is arranged between the heat storage module and the tractor of the elevator, the frequency conversion and voltage transformation module comprises a rectifier, an inverter and a transformer, an input end of the frequency conversion and voltage transformation module is connected to an output end for generating electric energy of the tractor of the elevator, an output end of the frequency conversion and voltage transformation module is connected to the heat storage module, the rectifier is configured to covert an unstable current output by the tractor into a direct current, the inverter is configured to convert the direct current into an alternating current, and the transformer is configured to maintain a stable frequency and voltage.

5. The electric boiler device based on utilization of residual energy of the elevator according to claim 1, wherein the electric heating module comprises a heating water tank and a water replenishment and supply unit, a heating unit, a second information collection unit and a second pressure release unit that are arranged on the heating water tank.

6. The electric boiler device based on utilization of residual energy of the elevator according to claim 5, wherein the heating water tank is a water storage unit for the electric heating module, the water replenishment and supply unit comprises a water inlet pump and a water supply valve, the water inlet pump is in communication with a heat storage water tank and the heating water tank, the water supply valve is in communication with the heating water tank and a user water supply pipe network, the heating unit is a second resistive electric heater, the second information collection unit is a second water temperature and water level sensor, and the second pressure release unit is a second pressure release valve.

7. The electric boiler device based on utilization of residual energy of the elevator according to claim 1, wherein the control module comprises a signal reception unit, a water level control unit and a water temperature control unit; the signal reception unit comprises a single-chip microcomputer, a minimum single-chip microcomputer system, a water tank temperature sensor sub-module and a water tank water level sensor sub-module, and the water level control unit comprises a water inlet valve control sub-module for controlling a heat storage water tank and a water inlet pump control sub-module for controlling a heating water tank; the water temperature control unit is a heating control sub-module for controlling the heating water tank, and the control module issues corresponding water temperature and water level control instructions according to water temperatures and water levels in the heat storage water tank and the heating water tank to perform water temperature and water level adjustment functions; and the control module is electrically connected to a first water temperature and water level sensor, a first resistive electric heater and a water inlet valve of the heat storage water tank, and is electrically connected to a second water temperature and water level sensor, a second resistive electric heater and a water inlet pump of the heating water tank.

8. A control method for the electric boiler device based on utilization of residual energy of an elevator according to claim 1, comprising:

connecting a heat storage module to a tap water pipe network, inputting tap water, performing functions of conversion, storage and boiler preheating of the residual energy of the elevator, and collecting and transmitting a water temperature and a water level of the heat storage module to a control module by a first information collection unit in the heat storage module; under the condition that a water level of a heat storage water tank is lower than a set threshold, issuing an instruction by the control module, performing water replenishment by a water replenishment unit to raise the water level to a set water level and performing a water replenishment function; and releasing, by a preheating unit, the residual energy of the elevator through an energy consumption resistor, converting the residual energy into heat energy of water, and preheating water in the heat storage water tank; and connecting an electric heating module to the heat storage water tank of the heat storage module, inputting water preheated by the heat storage module, performing an electric heating function in a heating water tank according to a set water supply temperature, and providing hot water service for a user; collecting and transmitting a water temperature and a water level of the electric heating module to the control module by a second information collection unit in the electric heating module, and performing a water replenishment and supply function by a water replenishment and supply unit according to hot water use condition of the user; under the condition that a water level of the heating water tank of the electric heating module drops, issuing an instruction by the control module, opening a water supply pump of the water replenishment and supply unit, delivering a preheated water resource in the heat storage water tank to the heating water tank of the electric heating module and performing a water replenishment function; under the condition that a water level of the heating water tank rises to a set water level, stopping water replenishment, and under the condition that a water temperature of the heating water tank is lower than a set temperature, turning on a power switch of a heating unit, and heating the heating water tank through a second resistive electric heater; and under the condition that a water temperature of the heating water tank rises to a user-set temperature, turning off a power switch of a heating unit and stopping operation thereof.

9. The control method for the electric boiler device based on utilization of residual energy of the elevator according to claim 8, wherein during water replenishment of the heat storage module, a multi-water-level dynamic adjustment water replenishment method is adopted, a multi-stage water replenishment strategy is selected between a lowest water level and a highest water level of the heat storage water tank, and the control module performs a dynamic adjustment function of the set water level according to a real-time water level and a real-time water temperature of the heat storage water tank and a user-set water temperature, and controls a water inlet valve of the heat storage water tank to be opened or closed.

* * * * *